United States Patent

[11] 3,586,168

[72] Inventors Sheldon Osheff
Chicago;
Carl A. Pesce, Oak Lawn, both of, Ill.
[21] Appl. No. 875,133
[22] Filed Nov. 10, 1969
[45] Patented June 22, 1971
[73] Assignee Continental Can Company, Inc.
New York, N.Y.

[54] ELECTRONIC CAN REJECT SYSTEM
10 Claims, 13 Drawing Figs.
[52] U.S. Cl. .................................................. 209/111.5,
209/74, 73/355
[51] Int. Cl. ..................................................... B07c 5/346
[50] Field of Search ........................................... 209/111.5;
73/15; 340/146.2, 228; 235/177, 92; 324/61, 65,
71; 317/132

[56] References Cited
UNITED STATES PATENTS

| | | | |
|---|---|---|---|
| 3,370,151 | 2/1968 | Normando .................. | 73/355 |
| 3,401,551 | 9/1968 | Maley .......................... | 73/15 |
| 3,433,052 | 3/1969 | Maley .......................... | 73/355 |
| 3,434,332 | 3/1969 | Maley .......................... | 73/355 |
| 3,451,254 | 6/1969 | Maley .......................... | 73/355 |

Primary Examiner—Allen N. Knowles
Attorneys—Americus Mitchell, Joseph E. Kerwin and William A. Dittmann ABSTRACT: An electronic circuit for receiving the output of one or more detector units which may pick up the infrared emission from a welded seam as it passes by the detector unit or units. The circuit sorts out high and low signals to give an indication of hot or cold spots which indicate deficient welding. The signal is used to operate indicators, counters, and a weld reject mechanism or marking means.

INVENTORS
SHELDON OSHEFF
CARL A. PESCE

BY *Adrienne Mitchell* ATT'Y.

ELECTRONIC CAN REJECT SYSTEM

Our invention relates to an electrical circuit for measuring the quality of the weld between two sheets of material.

Our invention relates to an electronic circuit for processing the signals from sensors mounted near a recently welded seam. More particularly our invention relates to electronic circuits for taking the electrical output of sensors near can seams and determining electronically whether the can seam is good and rejecting bad cans.

Today a variety of thermotesting apparatuses for detecting the quality of a weld between a pair of metallic elements are known. Radiant wave energy or electromagnetic wave energy has been used for the testing of cans by using light to detect pinholes in cans.

Up to this time no high-speed online electrical system for rejecting defective can welds has existed. The need for such a system is satisfied by our invention.

It is an object of the present invention to provide an electronic circuit which will convert electric signals taken from a series of detectors located across a weld seam. The signals are converted by the circuit into an indication of a good or bad seam and a reject mechanism is actuated.

It is a further object of the present invention to provide means associated with a detecting apparatus for removing cans or other articles found to have imperfect welded seams.

It is a final object of our device to provide an electronic logic circuit for signal analysis and reject utilization for welded and bonded seams.

Still further and more detailed objects and advantages of the invention will become apparent upon reading the following description of preferred forms of our invention illustrated in the accompanying drawings in which:

FIG. 3 shows the basic system with a low comparator modification.

For ease of description, our invention will be considered as the basic circuit and then the various modifications of the basic circuit to produce the final circuit will be described. Logic symbols used in this application may be found in "Logic Symbology," Hewlett Packard Company, Dymec Division, Revised 11-1-66.

In brief, our invention is an electrical logic device for the processing of electrical signals emanating from a weld temperature detector unit. The signals are analyzed for high weld temperature, good weld, cold weld, no weld, space between cans, and blank spot in the conveyor system. The defect reject mechanism is actuated at the proper time and the defects and defect signals may be counted if desired.

A basic purpose of our system is to generate a signal upon the receipt of a high- or low-temperature signal such as that developed by a can seam weld. Similarly the relative quality of the bond between two or more pieces of material can be detected by this device. This can be done either by monitoring the heat generated in the process of developing the weld or bond or by subsequent addition of heat energy where the bond quality will vary the amount of heat transferred to the sheet material sensed by the defect detector.

These limits depend on the nature of the materials to be welded, the type of the weld and other factors. A properly made weld gives off heat at a level between certain defined limits. Infrared heat detectors are frequently used for weld analysis. It is contemplated that a heat detector will generate an electrical temperature signal which signal is analyzed by our circuit.

Figure 1:
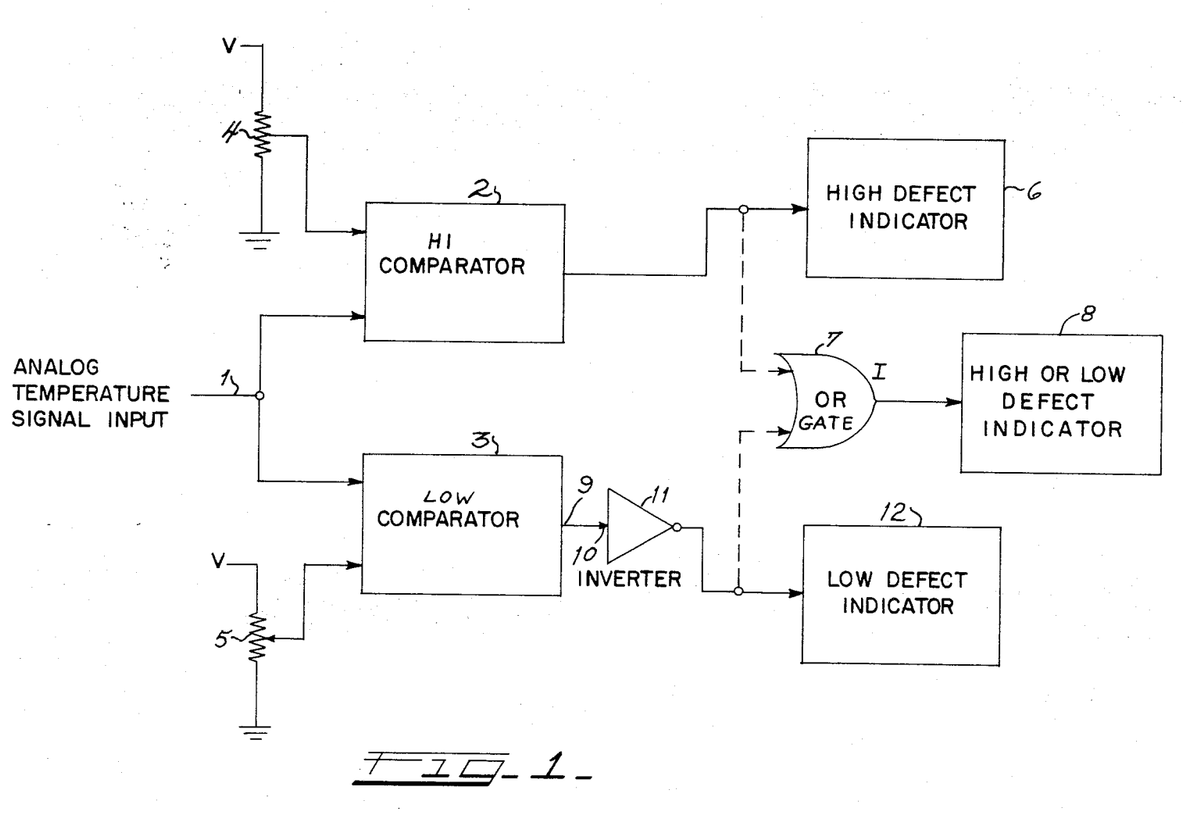
FIG. 1 shows an illustration of the basic electrical system.

The circuit shown in FIG. 1 has an input lead 1 to a high comparator 2 and a low comparator circuit 3. The signal is generated in whatever detector or detectors are used to scan the weld seam. The detector scans the weld seam, generating a signal which is a function of weld temperature. A good weld seam radiates energy representing a given temperature band throughout its extent. A defective weld seam indicates a temperature outside the temperature band for a good weld seam. A cold spot is found at the point where the weld temperature is too low and a hot spot is found at a point where the weld temperature is too high. The purpose of this electronic system is to recognize and reject from the production line those items which show hot spots or cold spots since this is an indication of a defective weld. The system leaves objects with a good weld seam in the production line to be used later on. Any rejection or marking of objects or cans with bad welds is within the scope of this invention.

The basic circuit shown in FIG. 1 shows to the left an analog temperature input lead 1. The electrical signal found in this lead is developed by a weld temperature sensing device. This device may be an infrared detector, for example. The analog temperature signal input lead is coupled to both the high comparator circuit 2 and the low comparator circuit 3.

The high comparator 2 turns on at signal levels which exceed a predetermined high reference level. This high reference level is the level above which the temperature signal is assumed to represent too high a temperature i.e. a defect. The low comparator 3 turns of at signal levels which are lower than a predetermined low reference level. This low reference level is the level below which the temperature is assumed to represent too low a temperature for a good weld. The reference signal is developed from a variable register 4 shown exterior to the high and low comparator unit. If the input signal is higher than the high comparator reference level an output signal is generated from the high comparator 2. This signal causes a high defect indicator 6 to flash or some other indicator to give a signal. The output signal of the high comparator 2 may also be conducted to an OR gate 7 and from the OR gate to a defect indicator 8 which responds to either a high or low defect signal.

The low comparator unit 3 is essentially the same unit as the high comparator unit and is set to respond to the normal good weld signal. There is a difference from the high comparator however in that the output 9 of the low comparator is connected to the input 10 an inverter 11. When the low signal is presented to the low comparator, the low comparator output turns off and causes the inverter to turn on which in turn causes the low defect indicator to give a defect indication. Also, the signal for the inverter 11 may be connected to an OR gate 7 to a defect indicator 8 which responds to either a high or low defect signal.

Figure 2:
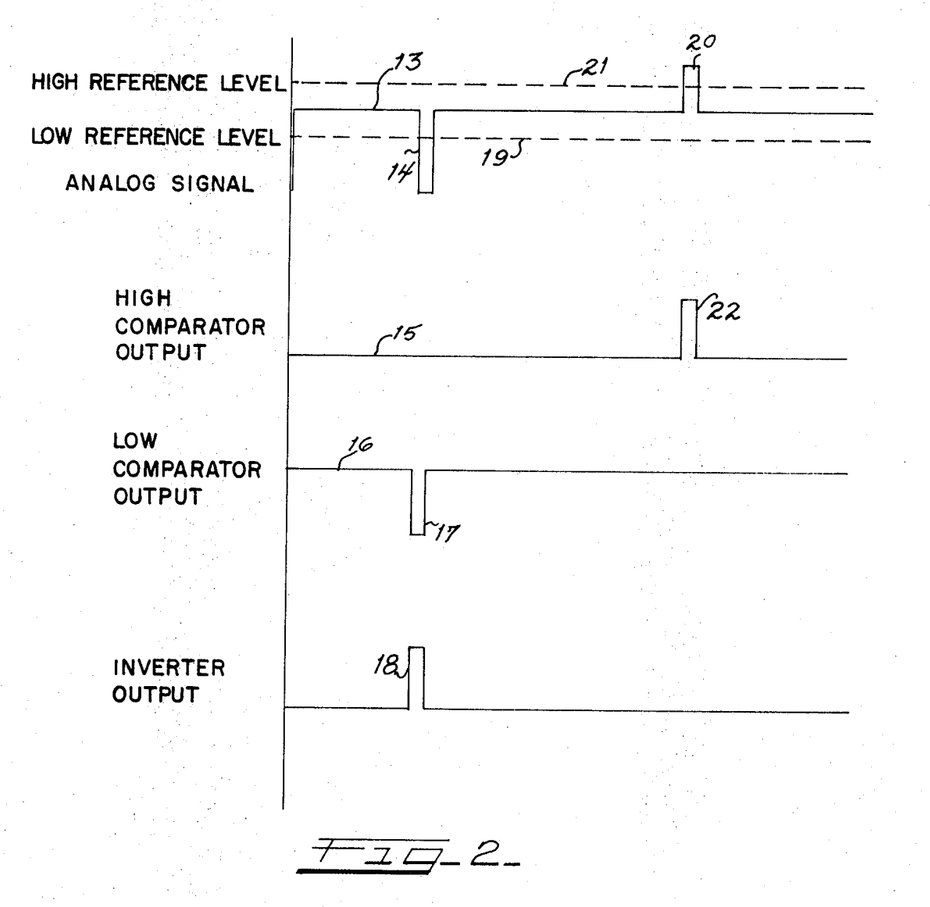
FIG. 2 shows the signal output of various elements of the basic electrical system.

The operation of this circuit is best shown by reference to FIG. 2. Here an analog signal 13 is fed into the input lead 1. The signal corresponds to the can temperature and on this particular signal the dip 14 in the signal level indicates a cold spot on a can. The high comparator output 15 is unaffected by this dip. However, the low comparator output 16 turns off to give a dip 17 when the cold spot signal 14 appears. Since the low comparator output 16 is off, the inverter turns on 18 which actuates the low defect indicator 12 and this signal passes through the OR gate 7 to the high or low defect indicator 8. The signal 14 must dip below the low reference level 19 to turn the low comparator off.

In this diagram a second defect is shown wherein the signal 20 goes above the high reference level 21 indicating an excessively high temperature caused by a weld defect. The high comparator 2 gives an output signal 22 responsive to this defect, i.e., the input signal caused the high comparator to turn on when the defect occurs. The low comparator inverter gives no signal but the high comparator output signal turns on a high defect indicator 6.

The circuit shown in FIG. 1 has, however, limitations. One is that the low comparator inverter output would turn on in the interval between cans. A system to correct this defect is shown in FIG. 3.

A single-shot monostable multivibrator 23 is connected as shown with the inverter 11 where both are connected to a first AND circuit 24. The monostable multivibrator 23 is turned on when the leading edge of the weld reaches the detector unit because at this point the low comparator 3 turns on. The transition from no comparator output signal to comparator output signal is used to turn on the monostable multivibrator 23. The output of the monostable multivibrator 23 is connected to one side of the first AND gate 24. The duration of this signal is equal to or slightly less than the expected analog can signal length as determined by the time it takes a can to pass the detector unit. Since both the inverter and multivibrator must be on in order to turn on the first AND gate, no output from the AND gate will occur during the interval between cans since the multivibrator output is off at this time. Therefore, an undesired defect indication is eliminated.

Figure 4:
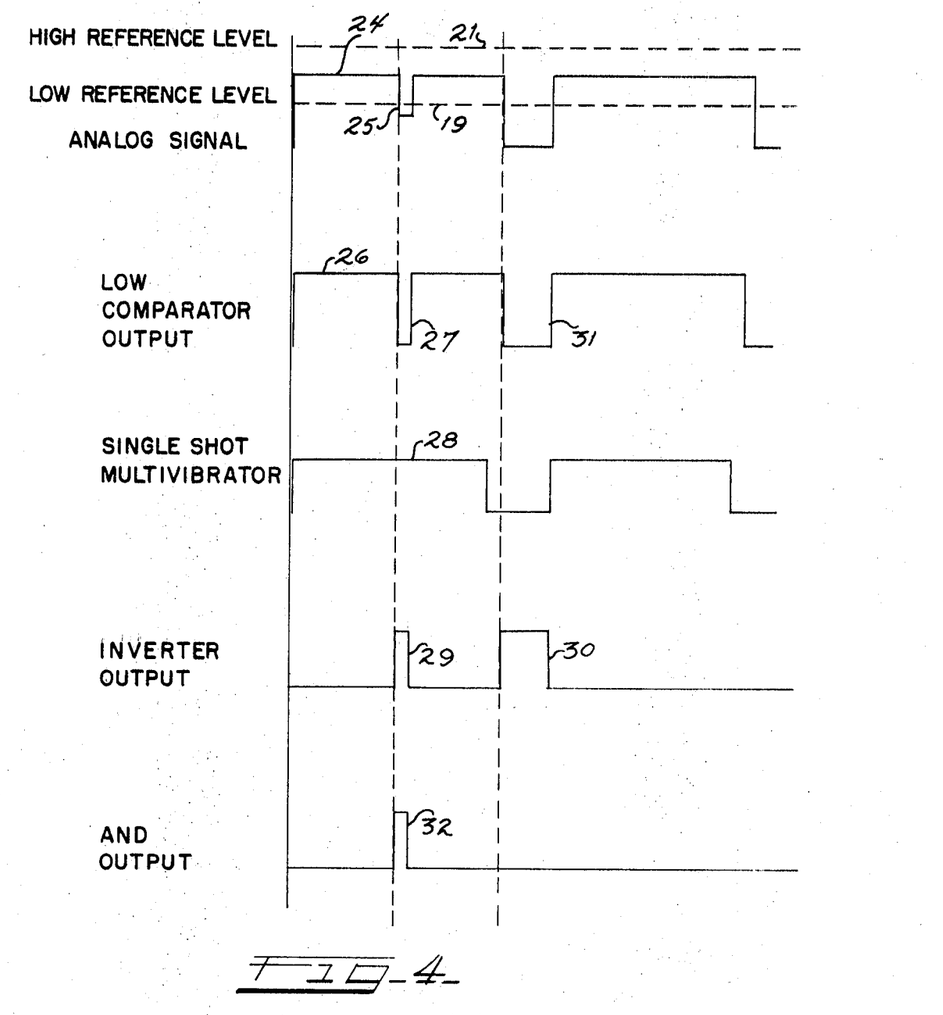
FIG. 4 shows the output of various elements of the system of FIG. 3.
Figure 5:
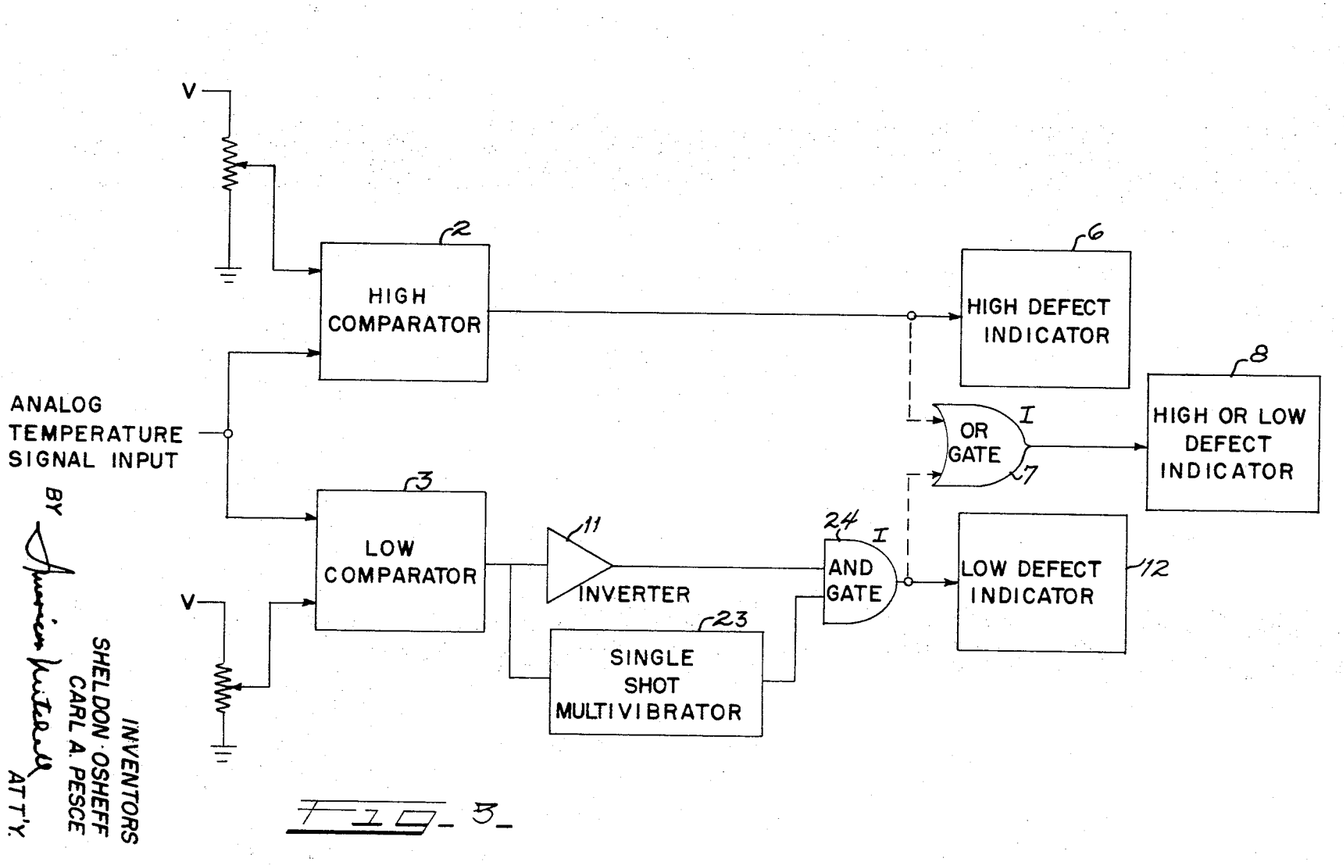
FIG. 5 shows a further modified electrical system having a shift register for the reject mechanism and a reset circuit for the single-shot multivibrator.

A timing diagram for the lower part of the circuit shown in FIG. 3 is found in FIG. 4. Here the analog signal 24 shows a cold spot or low signal 25 in the first can. The low comparator output 26 turns off 27 because the low signal falls below the low comparator reference level 19. The single shot multivibrator 23 is shown as having an output 28 from the time that the low comparator signal 26 starts. The single shot multivibrator signal output 28 continues to nearly the end of the can. The inverter turns on 29 at the time that the analog signal and the low comparator output signal turn off 25,27. The inverter output is off when the analog signal is normal and is on 30 during the gap between cans since the low comparator output is off 31 at that time. Lastly, the AND gate output which is coupled to the low defect indicator turns on 32 only when both the inverter output and the single shot multivibrator are on. The AND gate output lasts only for the period during which both single-shot multivibrator and the inverter outputs are on. However, because of the duration of time of the single-shot output, only low signals occurring during the time when the can is usually next to the detector will cause a defect indication. The inverter generates a signal only when the analog temperature signal is low. When the detector senses the signal generated from the space between the cans, the low comparator turns off and the inverter generates a signal. The single shot multivibrator is not at this time generating a signal and thus no signal is transmitted from the AND circuit to the low defect indicator. However, because of the duration of time of the single shot output, only low signals occurring during the time when the can is normally over the detector will cause defect indication. The circuit of FIG. 3 has an undesirable feature. Should a cold spot occur in the interval between turnoff of the single-shot multivibrator and the end of the can's analog temperature signal the multivibrator will be restarted. This restart signal will stay on past the start of the next analog signal interval, and turn off far short of the desired turnoff time near the end of the normal analog signal interval. This means that discrimination for cold spots cannot be made during the last portion of the second analog signal interval since the multivibrator output will be off. This problem is circumvented by adding second AND gate 33 and first flip-flop 34 as shown in FIG. 5. In addition, the single shot 23 is modified to be a resettable single shot 35 and thereby takes care of the situation where the analog input signal starts late compared to its normal cycle.

Figure 6:
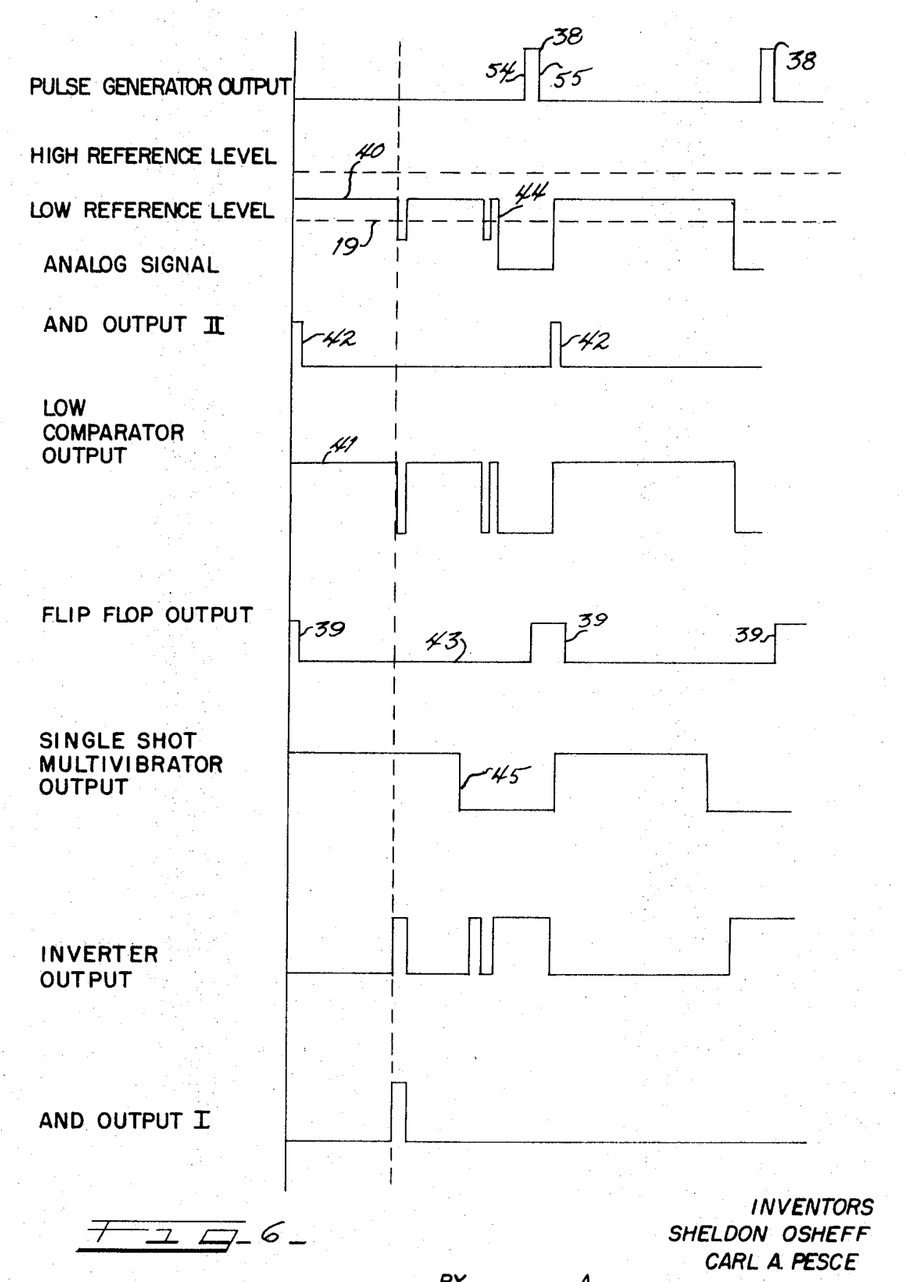
FIG. 6 shows the signal output from various parts of the circuit FIG. 5.

In the explanation below FIGS. 5 and 6 are considered together. FIG. 5 is a diagram of the circuit.

FIG. 6 shows a timing diagram illustrating the relationship between various signals in the circuit and explaining the circuit operation. A switch 36 or photoelectric eye (not shown) is connected to the production line transporting device. The switch 36 or photoelectric eye is operated once each time the workpiece moves one station length. This may be accomplished for example, by attaching dogs to a transport chain at single station intervals and arranging its operation so that the dog trips the switch each time it passes it. In any case, the single shot 37 generates a pulse 38 each time the can passes a given point. The pulse 38 is used to turn on the first flip-flop 34 giving a signal 39. When the analog temperature signal 40 rises, turning on the low comparator signal 41, the second AND gate 33 output is turned on 42. This, in turn, causes the resettable single-shot multivibrator 35 to start. The output of the single-shot multivibrator is connected by a lead 43 back to the flip-flop to turn it off 39. In doing so, it prevents the second AND circuit 33 from turning on again since the flip-flop 34 is off 43 until such time as the flip-flop is turned back on 39 again. This occurs only during the interval between cans when the pulse generator output is turned on by the aforementioned switch or electric eye. The pulse generator output 38 must appear during the interval between cans to turn flip-flop 34 on to give signal 39. The result of all this is that a cold spot 44 occurring after the single-shot multivibrator turns off 45, but before the analog signal interval is completed, does not cause the multivibrator to turn on again. This prevents incomplete interrogation for cold spots of the next analog signal interval, i.e. the circuit responds to cold spots in the next analog interval.

Figure 7:
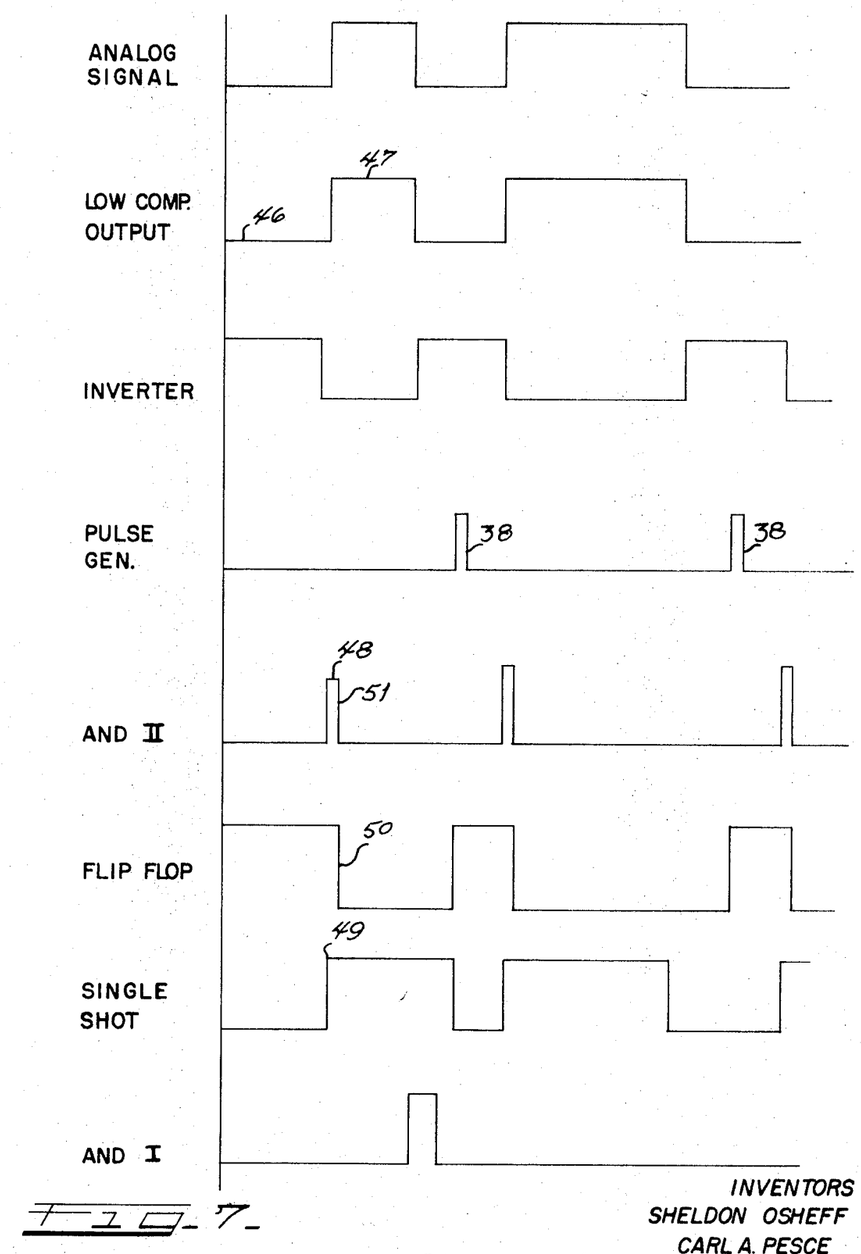
FIG. 7 shows the signal output from various parts of the circuit of FIG. 6.

FIG. 7 is a timing diagram which shows a late turn-on of the analog temperature signal and the relationship between signals so as to prevent incomplete interrogation of the analog signal interval. As was the case in the preceeding situation, the pulse generator is operated by a switch or photoelectric eye to generate a pulse 38 in the interval between cans. The low comparator gives not output during the late start period of the analog signal. As soon as the analog signal does rise, the low comparator output 46 turns on 47 thereby turning on 48 the AND circuit output. This in turn starts the single-shot multivibrator signal 49 whose output is connected back into the flip-flop, resetting it (i.e. turning it off), thereby turning off 51 the second AND gate. The single-shot multivibrator stays on until it times out normally or (as is shown) is reset by the occurrence of the pulse generated during the interval between cans, whichever comes first. This resetting action prevents the single shot from extending past the start of the second analog signal interval and stopping before the end of the analog signal interval. If it stopped in the middle of the analog signal, for example, then half of the can is examined for defects in the weld and the other half of the can is not examined for defects. Resetting of the single shot allows it to be restarted at the beginning of the second analog signal interval so that the duration of the single-shot multivibrator is such as to end at or just before the end of the analog signal interval thereby allowing interrogation of the signal for cold spots during the desired period. Thus it is seen that a late start, hot spot, or a cold spot occurring during the desired interval, all cause a defect indication to appear at the output of the OR gate 7. This defect indication may be used to reject the can on which the defect indication occurred.

FIG. 5 shows a means by which the rejection or identification of defectively welded cans may be accomplished. When the first OR gate 7 turns on to indicate a defect has occurred, this in turn turns on the second flip-flop 52 which stays on until such time as the pulse generator single shot 37 resets it. The pulse of the pulse generator single shot occurs in the interval between cans. The flip-flop 52 functions as a memory and goes on only once per can no matter how many defects may occur on a can. The output of the flip-flop is connected to the input of a shift register 53. The data presented to the shift register 53 by the flip-flop 52 is clocked into the shift register on the leading edge 54 (FIG. 6) of the pulse originating from the pulse generator single-shot in the interval between cans.

The flip-flop is reset on the trailing edge 55 of the pulse. The shift register is constructed to have as many stations or bits in it as there are can stations between the temperature detector and the point where rejection or identification of the defective cans is to be made. Each time the can moves one station, the pulse generator 37 outputs one pulse thereby moving the data within the shift register 53 forward one station. This action places the can on which a defect has occurred less than one station from the reject station when the defect signal corresponding to it has been clocked through the shift register and appears at the shift register output 54. When this signal appears at the output of the shift register, it starts a single-shot multivibrator 55 which is used to delay the initiation of rejection or identification for a length of time corresponding to the length of time it takes a can to move a fraction of a can station. The delay single shot is used in the circuit only to compensate for the fact that the detector station and the reject station is not an integral number of stations apart. This delay, allows the can to arrive at the reject station before initiation of rejection or identification occurs. The delay single shot 55 in turn starts a reject single-shot multivibrator 56 whose function it is to set the length of time that the identification or rejection mechanism 57, 58 is to be in operation.

Figure 8:
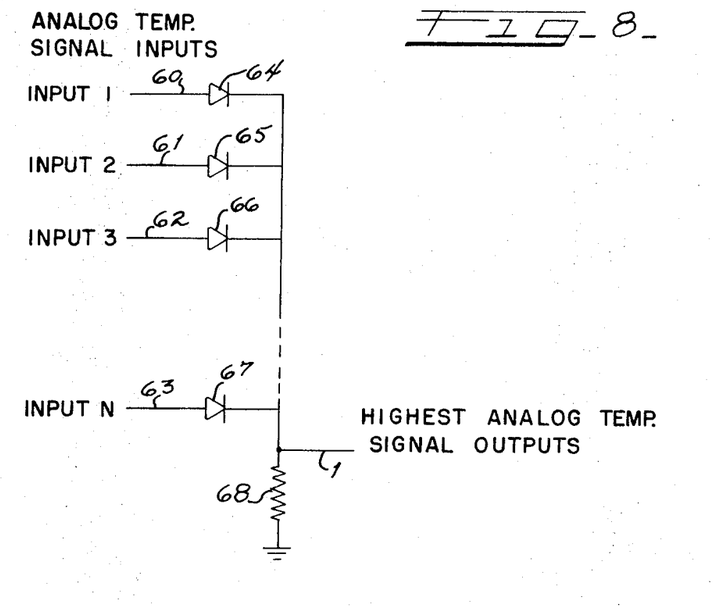
FIG. 8 shows a circuit for analog temperature input.
Figure 9:
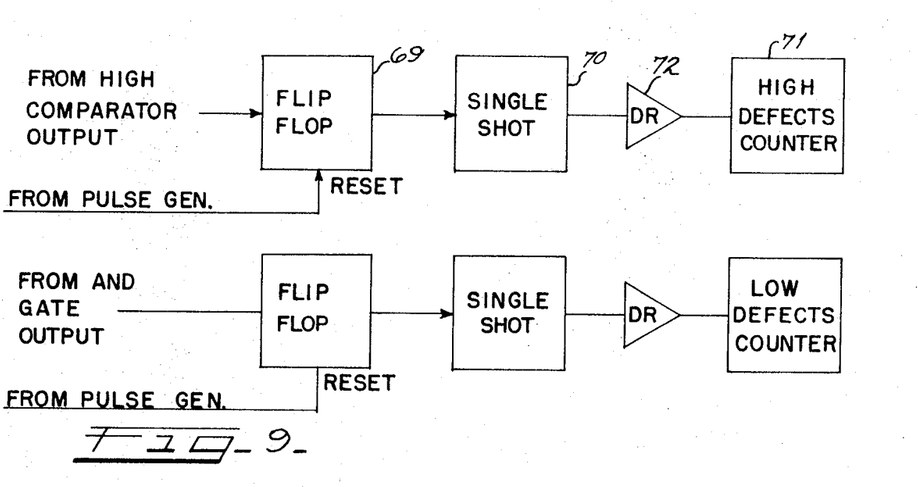
FIG. 9 shows high and low defect counter circuits.

Up to this point it has been considered that a single signal comes into the analog input. This is correct in that a single signal of some sort is conducted to the high and low comparator inputs. However, more than one detector may be required. That is, since the weld seam has a finite width, more than one detector may be required to scan the width of the weld seam in order to get adequate resolution and coverage. If multiple detectors are required, they may be connected as shown in FIG. 8 where the detector outputs 60—63 are connected to the anodes of diodes 64—67. If any of those diodes is in conduction by virtue of being forward biased, signals of lower value appearing on the other inputs will cause their respective diodes to be back biased, therefore, no conduction occurs at the back-biased diodes. This leads to a situation wherein only the highest instantaneous single input value will appear (minus the diode voltage drop) at the common cathode connection 1 of the diodes. Thus, only that signal which represents the highest temperature to which any of the multiple detectors are exposed will be conducted into the high and low comparator analog signal inputs. Register 68 allows current return to ground.

Where it is desired to keep a count of the number of cans having either hot or cold spot defects on them, implementation occurs as shown in FIG. 9. A third flip-flop 69 is connected to the output of the high comparator 2. Should a high-temperature defect occur causing the high comparator to turn on, the flip-flop in turn will be turned on. This starts monostable multivibrator single shot 70 whose function it is to provide a signal of long enough duration to successfully operate an electromechanical counter 71 or similar counting device through a driver 72 if required. The counter 71 then reads the total number of cans with hot spot defects on them. The flip-flop 69 provides the memory required and prevents multiple defects on a single can from causing more than one count on the counter 71. This is because the flip-flop is reset one time only for each can. The counter system for cans with cold defects on them operates in an identical manner—the only difference being that the input to the flip-flop now originates from the first AND gate 27 instead of from the high comparator output.

Figure 10:
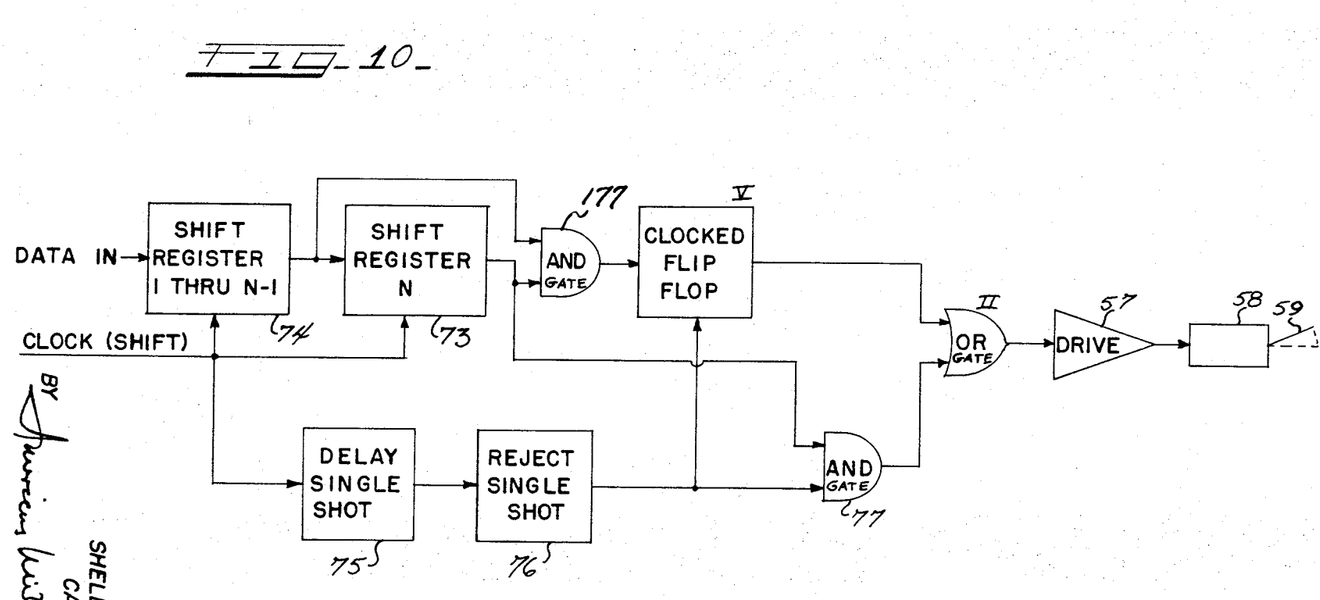
FIG. 10 shows the shift register circuit.

The embodiment of FIG. 5 shows a reject solenoid 58 and a reject arm 59 at the end of a circuit designed to cause the reject arm to move a defective can off the production line. The reject arm of the embodiment shown in FIG. 5 moves from a disengaged position to a can reject position 72 each time the defective can signal comes through to the drive means. If two or more successive cans are to be rejected, then with the system as shown in FIG. 5 the reject arm activates as many times as there are successive rejected cans. In many cases, this successive activation resetting of reject mechanism can be avoided if the reject mechanism is made to activate and stay activated until the last of the successive defective cans has been rejected, eliminating the resetting of the reject arm between each successive defective can. This avoids needless wear and noise. FIG. 10 shows an implementation of such a function and is a modification of FIG. 5. Data is conducted into the shift register in the same fashion as was done in FIG. 5. However, the shift register 53 now shown differs from before in that the last shift register station 73 is separated from the preceding shift register stations 74 in order to make the output of the next to the last station available. The output of the pulse generator 37 which generates a pulse during the intercan interval is fed to a delay single shot 75 and a reject single shot 76. These single shots have the same function as single shots 55, 56 of FIG. 5. The output of the reject single shot is coupled to a third AND gate 77. When a signal which represents a defective can appears at the output of the last shift register station, the AND gate 77 is turned on with the simultaneous turn on of the reject single shot. This in turn turns on the OR gate thereby actuating the reject or identification mechanism. Actuation of the mechanism ceases when the reject single shot turns off assuming that two successive defect signals have not appeared in the last two stations of the shift register. If, however, a signal did appear in the next to last station of the shift register, i.e., two successive defective cans occur, the AND gate 177 would be turned on since both the next to last and last shift register would be turned on. This inturn would have turned on the clocked flip-flop which in turn would turn on the OR gate thereby activating the identification or rejection mechanism. The clocked flip-flop would stay on (thereby keeping the reject arm activated) until the occurrence of the next reject single-shot timing cycle. At the beginning of that cycle the clock flip-flop will be turned off if the input to the clock flip-flop from the AND circuit is off, but will remain on otherwise. Thus, when two successive defective can signals are present at the output of the last two shift register station the reject arm will be kept activated between reject single-shot cycles by the clock flip-flop thus preventing the reject arm from going in and out between successive rejects.

Figure 11:
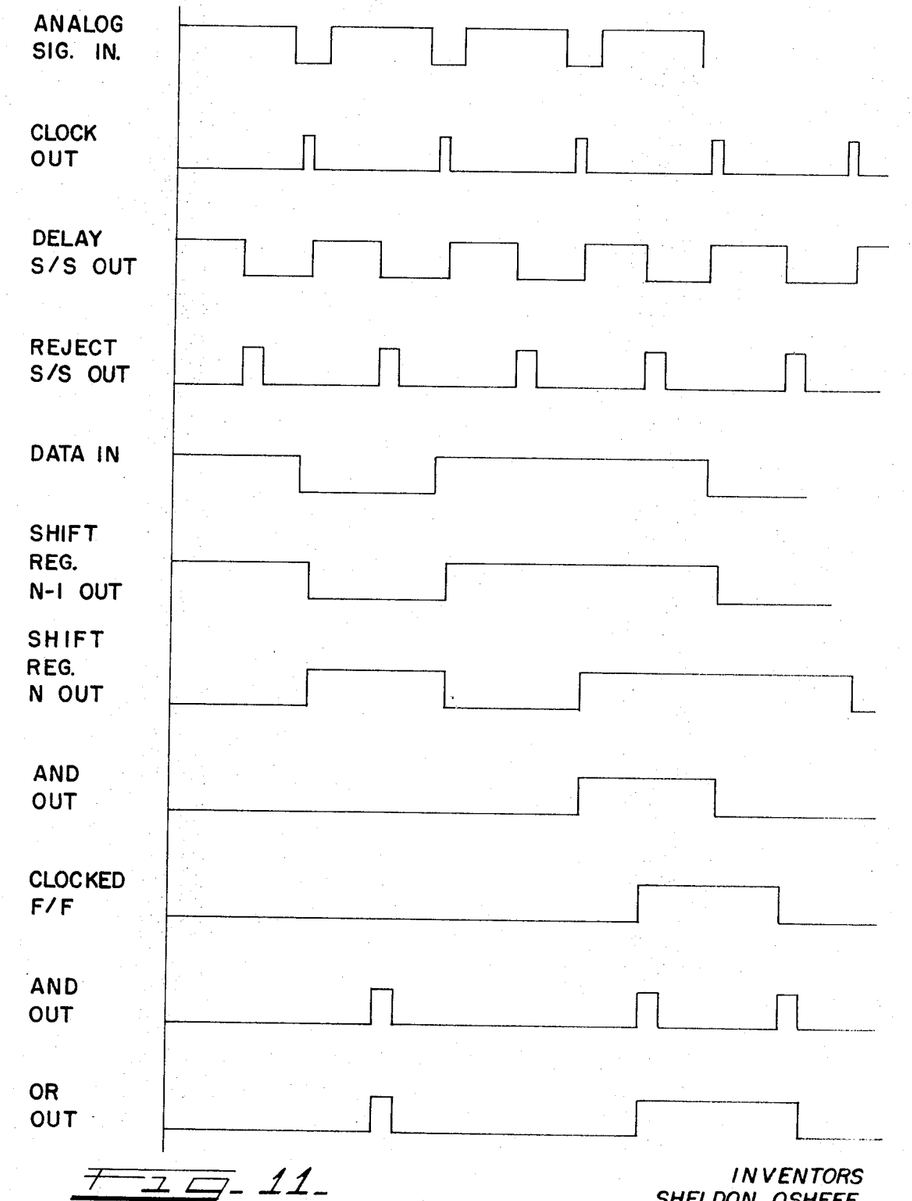
FIG. 11 shows the signal output from various elements of the circuit of FIG. 10.

A timing diagram showing the relationship between various signals in this circuit is shown in FIG. 11. The operation of the circuitry of FIG. 10 described in the foregoing paragraph may be made clearly understood by referring to FIG. 11.

Figure 12:
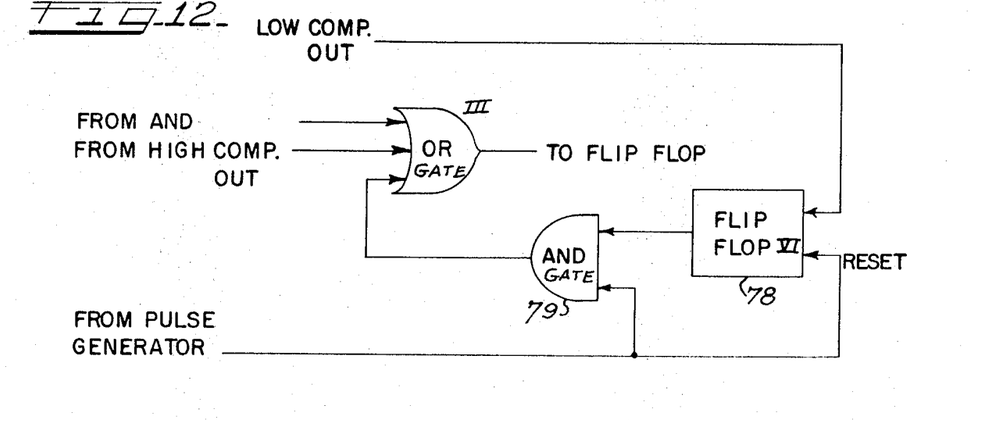
FIG. 12 shows an embodiment to be added to FIG. 5.
Figure 13:
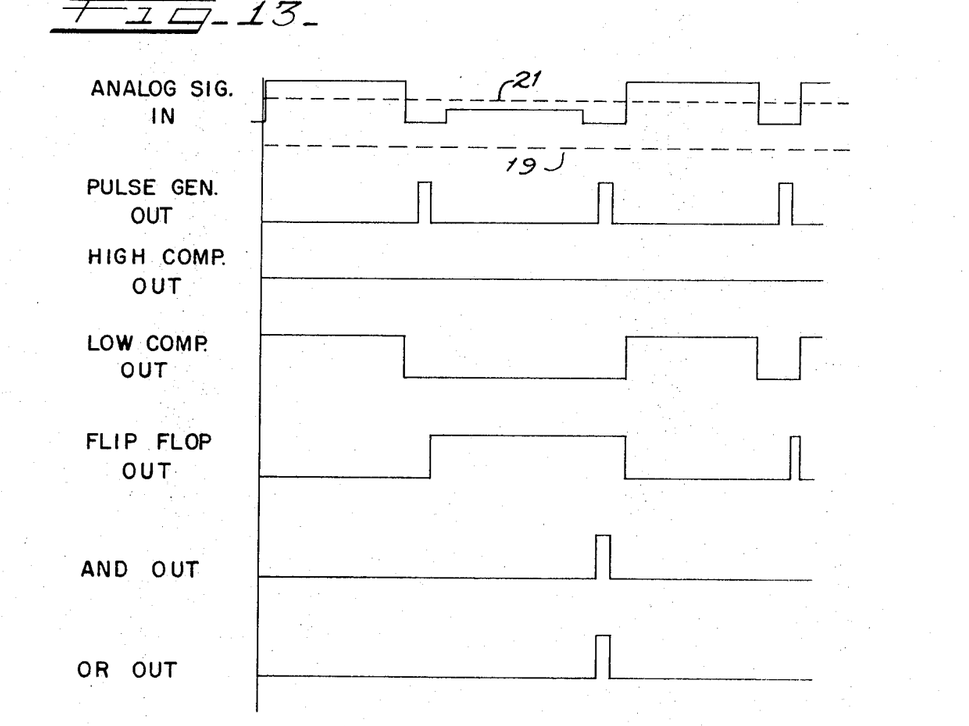
FIG. 13 shows the signal output from the elements of the circuit of FIG. 12.

Another situation not accounted for in the circuitry previously presented is found in the situation where the weld temperature signal is low or zero throughout the entire length of the normal weld interval. No reject indication occurs in such an event since the circuitry which determines the interval during which interrogation is made for cold spots or low signals has never been turned on since the low comparator does not turn on for such a signal. A circuit for eliminating this limitation is shown in FIG. 12. A timing diagram which shows the relationships between various signals in the circuit is shown in FIG. 13. The trailing edge of the pulse generated by flip-flop 37 during the interval between cans is used to turn on the sixth flip-flop 78 through a time delay. If the low comparator 2 output turns on, as would be the case if the analog signal reaches its normal level at any time during the normal analog signal interval time, the flip-flop 78 is reset and no output from the fifth AND circuit 79 occurs when the next pulse arrives from the pulse generator. However, if the low comparator 3 never turns on, for example if the analog signal stayed low or zero through the entire normal analog signal interval, the flip-flop 78 is not turned off so that when the next pulse from the pulse generator arrives, the AND circuit 79 is turned on. This in turn causes the OR gate 7 to turn on thus indicating a defective can. Thus, this circuit arrangement allows cans with cold and low signal levels across their entire length to be detected and later rejected or identified if desired.

Some advantages of this invention are that fewer defective cans are passed through a production line, this system lessens the amount of manual inspection necessary for a batch of cans and eliminates the need for further can-making operations before discovery of defective welds.

The foregoing is a description of an illustrative embodiment of the invention, and its applicant's intention in the appended claims to cover all forms which fall within the scope of the invention.

What we claim is:

1. An electrical circuit for processing weld monitor signals comprising:
   a high comparator circuit having an input and output,
   a low comparator circuit having an input and output,
   an inverter circuit for generating a signal when no signal is applied to the input of said inverter circuit, said inverter input being electrically connected to said low comparator output, and
   indicator means electrically connected to said high comparator and said inverter for utilizing signals from said comparator and said inverter to give an indication of a bad weld.

2. An electrical circuit for processing weld monitor signals as set forth in claim 1 in which said indicator means comprises:
   an electrical indicator electrically connected to said output of said high comparator, and
   an electrical indicator electrically connected to said output of said inverter.

3. An electrical circuit for processing weld monitor signals as set forth in claim 1 in which additional elements comprise:
   an OR gate having one input electrically connected to the output of said high comparator and another input electrically connected to the output of said inverter, and
   indicator means electrically connected to the output of said OR gate for utilizing signals from said OR gate to give an indication of a bad weld.

4. An electrical circuit for processing weld monitor signals as set forth in claim 1 in which additional elements comprise:
   a monostable multivibrator, and AND gate
   electrical connecting means connecting said multivibrator and said AND gate in series between the output of said low comparator and the input of said OR gate.
   electrical connecting means connecting the output of said inverter to the unused input of said AND gate.

5. An electrical logic circuit for processing signals derived from a sensing means for generating electrical signals in proportion to the heat emanating from a welded seam of succession of spaced objects comprising:
   a high comparator circuit having a plurality of inputs and an output,
   a low comparator circuit having a plurality of inputs and an output,
   reference signal biasing means electrically connected to each said comparator,
   a single-shot pulse generator,
   an inverter circuit for generating a signal at its output when no signal is applied to the input of said inverter circuit,
   a first AND gage having a first input and a second input and one output,
   an OR gate having a plurality of inputs and an output,
   conductive means connecting the output of said inverter circuit to said first input of said first AND gate,
   conductive means connecting the input terminal of said inverter to said low component output and connecting the output of said first AND gate to an input of said OR gate,
   conductive means connecting said output of said high comparator circuit to another input of said OR gate,
   a first flip-flop circuit having a reset input for turning said flip-flop off and a set input for turning said flip-flop on,
   conductive means electrically connecting the output of said OR gate to the set input of said flip-flop,
   a shift register having at least one shift station, each shift station having a data input, a shift input and a signal output,
   a second flip-flop circuit having a reset terminal, a set terminal and an output terminal,
   a resettable monostable multivibrator having a reset input, a set input and an output,
   means electrically connecting the output of said single-shot pulse generator to said set input of said second flip-flop, to said reset input of said resettable monostable multivibrator, to said reset terminal of said first flip-flop and to said shift input of each said shift register station,
   a second AND gate having a first and a second input and an output, conductive means connecting the output of said second AND gate to the set input of said resettable monostable multivibrator,
   conductive means connecting said output of said low comparator to said first input of said second AND gate,
   conductive means connecting said second input of said second AND gate to said second flip-flop output terminal,
   conductive means connecting said output of said resettable monostable multivibrator to said second input of said first AND gate,
   conductive means connecting said output of said resettable monostable multivibrator to said reset terminal of said second flip-flop,
   means electrically connected to the output of said shift register for generating a delayed signal to actuate a distinguishing means whereby an object having a welded seam which is defective may be distinguished from an object having a good seam.

6. An electrical logic circuit for processing signals derived from a sensing means for generating electrical signals in proportion to the heat emanating from the welded seam of a succession of spaced objects as set forth in claim 5 wherein the means for generating a delayed signal comprises:
   a delayed time single-shot multivibrator having an input and an output terminal,
   an actuation timer electrically connected to the output terminal of said multivibrator,
   distinguishing means electrically actuated by the output of said actuation timer for rendering said object, having poor welds distinguishable from the objects having good welds.

7. An electrical logic circuit for processing signals derived from sensing means for generating electrical signals in proportion to the heat emanating from the welded seam of a succession of spaced objects as set forth in claim 5 further comprising:
   a first conductive means electrically connected to the output of at least one detector unit,
   diode means having inputs electrically connected to said conductive means,
   a second conductive means electrically connected to the output of said diode means and electrically connected to the input terminal of said high comparator and said low comparator.

8. An electrical logic circuit for processing signals derived from sensing means for generating electrical signals in proportions to the heat emanating from the welded seam of a succession of spaced objects as set forth in claim 5 further comprising:
   a third flip-flop circuit having a reset terminal, a set terminal and an output terminal,
   means electrically connecting the output terminal of said high comparator to the set terminal of said flip-flop circuit,
   a first monostable multivibrator having an input terminal and an output terminal,
   means electrically connecting the output terminal of said flip-flop to the input terminal of said monostable multivibrator,
   a high defect counter having drive means,
   means electrically connecting the output terminal of said monostable multivibrator to the high defect counter,
   a fourth flip-flop circuit having a reset terminal, a set terminal and an output terminal,
   means electrically connecting said output terminal of said first AND gate to the set terminal of said fourth flip-flop, means electrically connecting said output terminal of said pulse generator to said reset terminal of said fourth flip-flop, a second monostable multivibrator having an input terminal and an output terminal, means electrically connecting the output terminal of said fourth flip-flop to the input terminal of said second monostable multivibrator, a low defect counter having drive means, and an input terminal means electrically connecting the output terminal of said second monostable multivibrator to the input terminal of said low defect counter whereby said low defect counter registers the number of defective objects detected in a series of welded objects.

9. An electrical logic circuit for processing signals derived from a sensing means for generating electrical signals in proportion to the heat emanating from a welded seam of a succession of spaced objects as set forth in claim 5 in which said shift register and said means for generating a delayed signal comprise;

a plurality of shift register shift stations electrically connected with the signal output of one station electrically connected to the data input of its successor and said single-shot pulse generator being electrically connected to the shift input of each station, a fourth AND gate having two inputs and an output, conductive means connecting an input of said fourth AND gate with the input post of the last shift register shift station, conductive means connecting the other input terminal of said fourth AND gate to the output terminal of next to said last shift register shift station, a clocked flip-flop having a set terminal, a reset terminal and an output terminal, conductive means electrically connecting the date terminal of said clocked flip-flop to the output terminal of said fourth AND gate, a second OR gate having inputs and an output, conductive means electrically connecting an input of said second OR gate with the output of said clocked flip-flop, distinguishing means for making said defectively welded objects distinguishable, conductive means electrically connecting the input of said distinguishing means with the output of said second OR gate, delay single-shot means for delaying an electrical impulse a predetermined time, conductive means connecting the input of said delay single-shot means to said pulse generator single-shot output, a reject single-shot multivibrator, conductive means electrically connecting the input of said reject single shot to the output of said delay single shot, a third AND gate having two inputs and one output, conductive means between one input of said fourth AND gate and the output of said last shift register shift station, conductive means for electrically connecting the reset input of said clocked flip-flop to the output of said reject single shot, conductive means electrically connecting the other input of said third AND gate to the output of said reject single shot, and conductive means electrically connecting the output of said third AND gate to an input of said second OR gate.

10. An electrical logic circuit for processing signals derived from sensing means for generating electrical signals in proportion to the heat emanating from the welded seam of a succession of spared objects as set forth in claim 5 further comprising;

a flip-flop having a set input, a reset input and an output, conductive means for electrically conducting output of said low comparator circuit to the set input of said flip-flop, fifth AND gate having two inputs and one output, conductive means electrically connecting the output of the flip-flop to one of said fifth AND gate terminals, conductive means electrically connecting the output of said single shot pulse generator to the other input of said fifth AND gate to the reset input of said flip-flop, conductive means electrically connecting the output of said fifth AND gate to a third input of said second OR gate.